United States Patent [19]

Broadhurst

[11] 4,364,173

[45] Dec. 21, 1982

[54] METHOD OF MAKING AN ELECTRICAL CONTACT

[75] Inventor: Richard C. Broadhurst, Harrow, England

[73] Assignee: Johnson, Matthey & Co., Limited, London, England

[21] Appl. No.: 201,027

[22] Filed: Oct. 27, 1980

Related U.S. Application Data

[63] Continuation of Ser. No. 39,746, May 16, 1979, abandoned.

[30] Foreign Application Priority Data

May 17, 1978 [GB] United Kingdom ............... 20132/78

[51] Int. Cl.³ ........................ B23P 11/02; B23P 19/02; B21D 39/00; H01R 43/04

[52] U.S. Cl. .................................... 29/882; 29/522 R

[58] Field of Search ...................... 29/243.53, 509, 521, 29/522 R, 522 A, 566, 874, 882

[56] References Cited

U.S. PATENT DOCUMENTS

| | | | |
|---|---|---|---|
| 3,034,641 | 5/1962 | Kochan | 29/566 |
| 3,346,951 | 10/1967 | Gwyn | 29/882 X |
| 3,377,700 | 4/1968 | Cooley | 29/882 |
| 3,432,925 | 3/1969 | Woolley | 29/882 |

*Primary Examiner*—Ervin M. Combs

*Attorney, Agent, or Firm*—Cushman, Darby & Cushman

[57] ABSTRACT

This invention relates to electrical contacts. The invention is specifically directed to electrical contacts comprising a base and a contact element having a contact surface and one method of making the contact includes the following steps:

1. forming a blind or through hole in the base with at least one protrusion extending inwardly from the wall of the hole;
2. inserting into the hole a contact element billet having a contact surface, and
3. deforming the so inserted contact element billet so that the billet is at least partially retained within the hole by means of the said protrusion.

10 Claims, 2 Drawing Figures

METHOD OF MAKING AN ELECTRICAL CONTACT

This is a continuation of application Ser. No. 39,746, filed May 16, 1979, abandoned.

This invention relates to electrical contacts having improved cost-effectiveness as regards consumption of precious metal and to improve methods of manufacture of such contacts.

The use of a bi-metal contact in which an inlay or facing of the contact material is bonded (usually) to a copper or copper alloy backing has many advantages in contact engineering. In a number of configurations which are electrically and mechanically useful, however, it has proved difficult to weld a silver disc or button onto a copper backing. This is particularly true when large scale production techniques are contemplated, e.g. by use of the so-called "Schlatter"-type of contact welding machine.

It is an object of the present invention to securely attach a high conductivity, oxidation and wear resistant metal in the form of an inlay of disc or other shape providing a contact surface to a base preferably metallic in the form of a backing strip or sheet in such a way that the inlay lies flush with, proud or, or inset relative to one surface of the base but produces no protuberance on the opposite face of the base. It is another object of the present invention to securely attach a high conductivity, oxidation-and-wear-resistant inlay of dome, hemispherical, rectangular or other shape to the base in such a way that the contact face protrudes above the surface of the base. It is a further object of the present invention to produce a contact utilising a smaller volume (and therefore quantity) of precious metal in comparison with prior art contacts. According to one aspect of the invention a method of making an electrical contact comprises a base and a contact element having a contact surface, the method including the steps of:

1. forming a blind or through hole in the base with at least one protrusion extending inwardly from the wall of the hole;
2. inserting into the hole a contact element billet having a contact surface, and
3. deforming the so inserted contact element billet so that the billet is at least partially retained within the hole by means of the said protrusion.

Preferably, the protrusion extends around the total periphery of hole and at a position intermediate the ends thereof.

According to a second aspect of the present invention a method of making an electrical contact comprising a base and a contact element having a contact surface made from a material consisting of or containing a noble metal, includes the following steps:

(a) forming a blind or through hole in the said base said hole having a shape and size less than that required to accept the contact surface of the contact element;
(b) enlarging at least the entrance of the said hole to an extent to accept the contact surface area of the element and forming a protrusion extending inwardly from the wall of the hole and at a position displaced from the entrance of the hole;
(c) placing the said base on a rigid underlying support;
(d) inserting into the hole a contact element billet made from a metal and having a surface containing a noble metal, a noble metal alloy or a composite material containing a noble metal, and
(e) deforming the so-inserted billet to substantially fill the hole and encompass the protrusion to retain the billet in the hole and produce a contact surface which lies flush with, proud of or inset with respect to the surface of the base.

Enlargement under step (b) above is preferably carried out using a punch of appropriate shape and size. For example, the punch may have a first part shaped to enter the hole which acts as a guide and a second part shaped to form enlargement of the said entrance and create "upsetting" of material surrounding the hole to create the protrusion.

According to modification of the second aspect of the present invention, the step (e) may comprise compressing the contact element billet with a tool having a shaped recess so as to form, during compression, a contact surface having a domed or other shape as desired projecting above the surface of the said metal base but securely attached thereto by compressing the billet to conform with the contour including the protrusion of the wall of the hole.

The base may be perforated and each perforation is filled by compressing the contact element billet having a noble-metal containing face to form an oxidation and wear-resistant contact surface. Conveniently the main body of the said billet is made from a base metal, a base metal alloy or a composite material containing a dispersion of electrically conducting particles in mechanically rigid connection to the noble metal noble metal alloy or a composite containing a noble metal contact face, said body being compressed and retained in position by the protrusion which is conventionally formed during or after perforation.

The metal contact element billet with noble metal facing or inlay is, preferably, produced by powder metallurgical techniques, e.g. compacting and sintering. Other methods may be used, however, e.g. a solid aluminium billet may have a silver or silver alloy top facing or inlay constituting the contact face.

Electrical contacts according to the present invention preferably have copper as the major component of the metal base and silver or silver alloy as the major constituent of the noble metal component of the facing material. A suitable thickness for the metal base is 0.09 inches.

The invention will now be described by way of example, with reference to the accompanying drawings in which.

Figure 1:
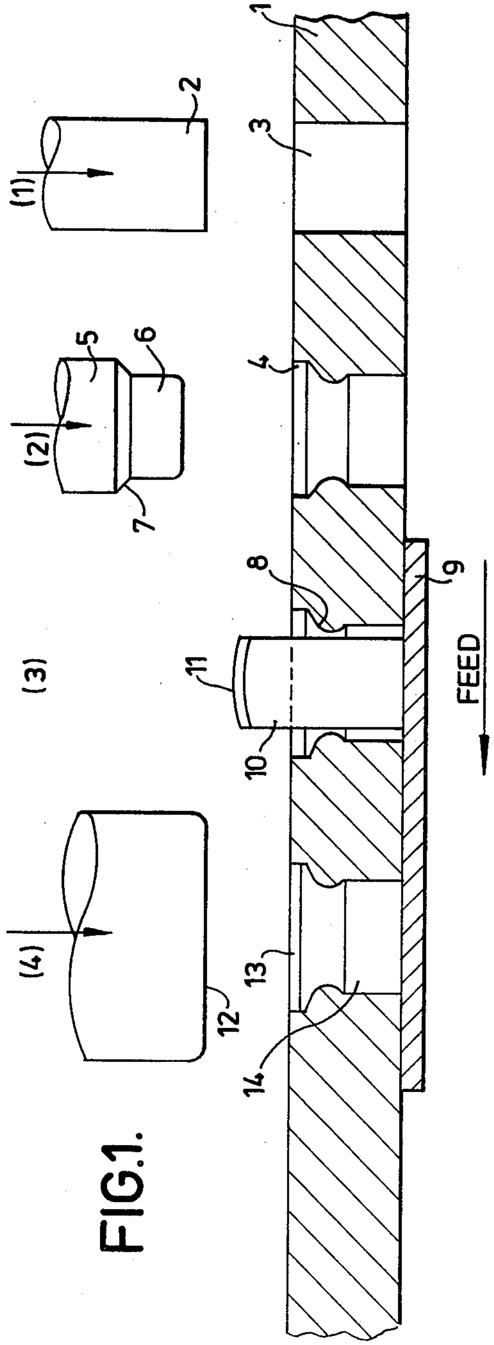
FIG. 1 is a diagram illustrating the steps of the method designated by bracketed numbers (1)–(4).

In FIG. 7, the metal base 1 is made of copper or a copper containing alloy and is suitably of a thickness within the range 0.04–0.2 inches. A punch tool 2 is made of tool steel and has a width within the range 0.08 to 0.4 inches. It is used to punch hole 3 with a force within the approximate range 1000–10,000 lb. force, and typically 3000–5000 lb. force. The upper rim of hole 3 is enlarged at 4 by use of tool 5 having an entry portion 6 slightly less than the existing dimension of the hole 3 and a wider dimensional portion 7 which has the effect of enlarging the rim 4 by compression deformation using a force less than that required for the punching of hole 3 and forming inwardly extending annular protrusion 8 in the wall of hole 3. Tool 5 is preferably made of tool steel. The protrusion 8 projects inwardly by an amount of approximately 0.015 inch.

Figure 2:
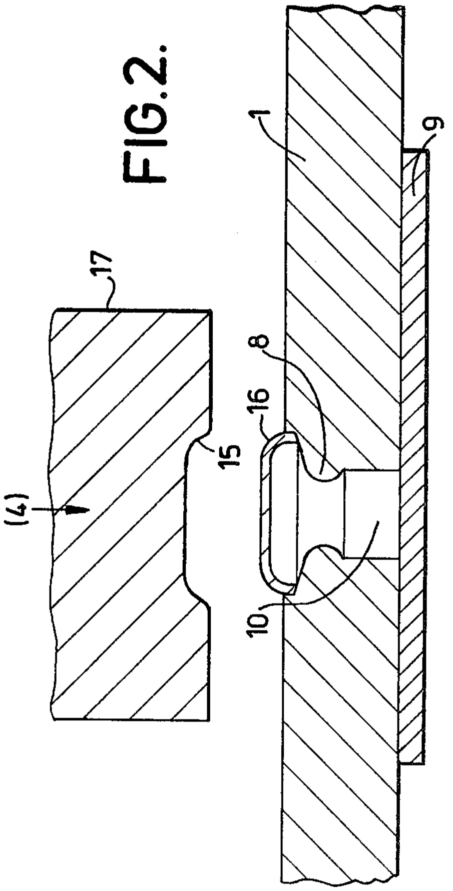
FIG. 2 illustrates a modification of the invention in which a recessed compression tool or die is used to produce a domed or other wise raised contact surface.

A rigid underlying support 9 is used to support the metal base 1 when a contact element metal billet 10 having a top-facing 11 containing noble metal is rapidly compressed in the hole 3 by the tool 12 under a force of 3000–5000 lb. force. The compacted and deformed billet 10 is designated at step 4 as 14 and the noble metal containing contact face 11 is designated 13. The contact surface 13 lies flush with the surface of metal base 1. Support 9 may then be removed and the base bearing a number of contacts is segmented into smaller units as required. A modification of the invention is shown in FIG. 2 where the billet 10 is supported by rigid support 9 and is stamped with a tool 17 having a recess 15 which imparts a desired shape to noble metal containing contact surface 16. Compacted base metal in billet 10 has approximately 98% of the theoretical density of base metal in the billet 1.

In a further modification the support 9 may have raised portion contoured to enter hole 3 from underneath. In this case the compressed billet does not entirely fill the hole.

If desired, the base metal billet 10 may have a noble metal facing at both ends, thus producing a double faced contact.

The base 1 and the billet 10 may be made from the same or different materials.

What is claimed:

1. A method of making an electrical contact comprising a base and a contact element having a contact surface made from a material comprising a noble metal, the method comprising:

(a) forming a hole in said base, said hole having a shape and size less than that required to accept the contact surface of the contact element;

(b) enlarging at least an entrance of the said hole, to an extent to accept the contact surface area of the element, by compression deformation, transversely of the base, of material around the entrance to the hole so as to cause the compression deformed material to form a protrusion extending inwardly from the wall of the hole and at a position displaced from the entrance of the hole;

(c) placing the said base on a rigid underlying support;

(d) inserting into the hole having the previously formed protrusion therein, a contact element billet made from a metal and having a contact surface comprising a noble metal; and (e) deforming the so-inserted billet to substantially fill the hole and encompass the protrusion to retain the billet in the hole and produce a contact surface with respect to the surface of the base.

2. The method of claim 1 wherein the protrusion is formed to extend around the total periphery of the hole and at a position intermediate the ends thereof.

3. The method of claim 1 wherein the contact surface is produced to be proud of the surface of the base.

4. The method of claim 2 wherein the contact surface of the contact element has a cross-sectional area greater than the cross-sectional area of the remainder of the contact element.

5. The method of claim 1 wherein the contact element billet comprises silver, aluminum or copper.

6. The method of claim 5 wherein the base comprises at least one member of the group consisting of copper and aluminum.

7. The method of claim 5 wherein the contact surface comprises silver, gold or a platinum group metal.

8. The method of claim 1 wherein the hole in the base is a through hole.

9. The method of claim 1 wherein the contact surface is produced flush with the surface of the base.

10. The method of claim 8 wherein the opposite surface to the contact surface of the inserted and deformed billet is also flush with a surface of the base.

* * * * *